(12) United States Patent
Schmauder (10) Patent No.: US 8,909,367 B2
(45) Date of Patent: Dec. 9, 2014

(54) MACHINE FOR MACHINING WORKPIECES AND A METHOD OF MACHINING WORKPIECES

(75) Inventor: Frank Schmauder, Metzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 342 days.

(21) Appl. No.: 13/618,373

(22) Filed: Sep. 14, 2012

(65) Prior Publication Data
US 2013/0054004 A1 Feb. 28, 2013

Related U.S. Application Data

(62) Division of application No. 12/146,021, filed on Jun. 25, 2008, now Pat. No. 8,294,061.

(30) Foreign Application Priority Data

Jun. 30, 2007 (EP) .................................... 07012864

(51) Int. Cl.
*B23Q 15/00* (2006.01)
*B23K 26/02* (2014.01)
*B23K 26/08* (2014.01)
*B23K 26/00* (2014.01)
*B23K 26/38* (2014.01)
*G05B 19/00* (2006.01)

(52) U.S. Cl.
CPC ............ *B23K 26/0853* (2013.01); *B23K 26/02* (2013.01); *B23Q 15/00* (2013.01); *G05B 19/00* (2013.01); *B23K 26/0093* (2013.01); *B23K 26/0869* (2013.01); *B23K 26/38* (2013.01); *B23K 2201/18* (2013.01)
USPC ............................ 700/159; 700/166; 700/172

(58) Field of Classification Search
CPC .... B23Q 15/00; B23K 26/02; B23K 26/0093; G05B 19/00
USPC ......... 700/159, 166, 172; 219/121.67–121.72, 219/121.83; 408/1 R
See application file for complete search history.

(56) References Cited

U.S. PATENT DOCUMENTS 3,764,775 A 10/1973 Hasslinger et al.
4,215,299 A 7/1980 Edwin et al.
(Continued)

FOREIGN PATENT DOCUMENTS

DE 19581537 6/1997
EP 0594699 5/1994
(Continued)

OTHER PUBLICATIONS

European Search Report for corresponding European Patent Application No. EP 07012864, mailed Dec. 18, 2007, 6 pages.

*Primary Examiner* — Samuel M Heinrich
(74) *Attorney, Agent, or Firm* — Fish & Richardson P.C.

(57) ABSTRACT

Machines for machining workpieces, especially metal sheets, include a machining device, a main drive, and an auxiliary drive that is different therefrom. Both drives serve to generate a relative movement between the machining device and a workpiece, wherein the machining device is movable relative to the workpiece and/or the workpiece is movable relative to the machining device with a main movement by means of the main drive and wherein the machining device is movable relative to the workpiece with an auxiliary movement by means of the auxiliary drive. Machines with high adaptability to different machining tasks are provided. Methods of machining workpieces include corresponding method steps.

5 Claims, 6 Drawing Sheets

(56) References Cited

U.S. PATENT DOCUMENTS

| | | |
|---|---|---|
| 4,328,411 A | 5/1982 | Haller et al. |
| 4,335,296 A | 6/1982 | Bredow |
| 4,585,379 A * | 4/1986 | Nagayama et al. ............ 409/147 |
| 4,698,480 A | 10/1987 | Klingel |
| 4,851,637 A | 7/1989 | Puozzo et al. |
| 5,109,148 A | 4/1992 | Fujita et al. |
| 5,574,348 A | 11/1996 | Ehlerding |
| 5,784,281 A * | 7/1998 | Rowlette ........................ 700/181 |
| 5,854,460 A | 12/1998 | Graf et al. |
| 6,144,009 A | 11/2000 | Ulrich |
| 6,263,255 B1 * | 7/2001 | Tan et al. ....................... 700/121 |
| 7,161,114 B2 | 1/2007 | Zeygerman |
| 7,482,776 B2 | 1/2009 | Scholich-Tessmann |
| 8,725,283 B2 * | 5/2014 | Gray et al. ..................... 700/186 |
| 2003/0034336 A1 | 2/2003 | Erlenmaier et al. |

FOREIGN PATENT DOCUMENTS

| | | |
|---|---|---|
| EP | 1557244 | 7/2005 |
| JP | 216291 | 2/1990 |
| JP | 11277285 | 10/1999 |
| JP | 2005288541 | 10/2005 |
| WO | 0017724 | 3/2000 |

* cited by examiner

MACHINE FOR MACHINING WORKPIECES AND A METHOD OF MACHINING WORKPIECES

CROSS REFERENCE TO RELATED APPLICATIONS

This application is a divisional of U.S. application Ser. No. 12/146,021, filed on Jun. 25, 2008, which claims priority under 35 USC §119(a) from European Patent Application No. 07 012 864.0, filed on Jun. 30, 2007. The content of both priority applications is hereby incorporated by reference in its entirety.

TECHNICAL FIELD

This invention relates to a machine for machining workpieces, e.g., metal sheets, and a method of machining workpieces.

BACKGROUND

EP 0 594 699 B1 discloses a machine tool for laser machining of workpieces that has a gantry arranged above a workpiece and a tool carrier arranged on the gantry. To generate a main movement of a laser beam arranged as a machining device on the tool carrier, the gantry is moved together with the tool carrier and/or the tool carrier is moved along the gantry. An auxiliary movement of the laser beam relative to the tool carrier is generated by means of a high-dynamic auxiliary device. In order to achieve an overall acceleration of the laser beam which is as high as possible, the movement of the gantry and the tool carrier is superimposed by the auxiliary laser-beam movement generated by means of the high-dynamic auxiliary device. In the case of this auxiliary movement, the laser beam starts from an invariable initial position.

SUMMARY

The invention features, in one aspect, a machine for machining workpieces, especially metal sheets. The machine includes a machining device; a main drive configured to move the machining device relative to the workpiece and/or the workpiece relative to the machining device with a main movement; an auxiliary drive which is different from the main drive, the auxiliary drive being configured to move the machining device relative to the workpiece with an auxiliary movement; and an adjusting drive which is different from the main drive and by means of which the machining device can be positioned within an adjustment region into different initial positions, starting from which the machining device is movable by the auxiliary drive.

The invention also relates to a method of machining workpieces of the above type, a machining program, a method of writing a machining program of this type and a computer program product for implementing a method of writing a machining program of the aforementioned type.

In preferred implementations, the machines and methods of machining workpieces disclosed herein provide high adaptability to different machining tasks.

By using the adjusting drive to position the machining device in different initial positions, the movement of the machining device can be adapted to different requirements arising during the machining of a workpiece. As a result of the auxiliary movements, high-dynamic workpiece machining, e.g. high-dynamic laser cutting, can simultaneously be ensured substantially within the entire adjustment region of the machining device. In the case of a laser-cutting machine, a movement or working region of the laser-cutting beam during a laser-cutting process can be differently defined by means of differently preset initial positions. The definition of the movement or working region of the laser-cutting beam can be adapted to the machining task to be carried out, for example the high-dynamic cutting out of very small sheet-metal blanks or the high-dynamic cutting out of relatively large waste components.

In order to carry out a method of the type according to the invention, a machining program written especially for this purpose is run on a numerical machine control system of the machine according to the invention. Machining programs comprise a plurality of control commands which for the most part induce the machine control system to generate adjusting signals for the drives of the machine, by means of which the movements of the driven components of the machine are effected, which movements are necessary for presetting and for the machining sequences.

The machining program contains control commands, on the basis of which the machine control system generates adjusting signals for the adjusting drive of the machining device, by means of which signals the adjusting drive is for its part induced to position the machining device into different initial positions.

Within the machining program, the control commands for the adjusting movement of the machining device into a defined initial position are arranged before control commands which effect the machining process for which the predefined initial position of the machining device is necessary or advantageous.

In some implementations, the possibility of changing the initial position of the machining device is already taken into consideration during the writing of the machining program. The control commands for the adjusting movements of the machining device into different initial positions are generated during the writing of the machining program and are arranged in the correct order with other control commands.

To write machining programs, a computer-aided programming system is usually used in practice and substantially comprises a computer program product which is run on a data processing system (e.g. a computer). The programming system allows a user to define different initial positions of the machining device if this is necessary or advantageous and supports the generation of the control commands for the adjusting movements into different initial positions. Advantageously, the definition of different initial positions and the generation of the corresponding control commands by the programming system take place substantially automatically.

In some implementations, the adjusting drive is formed by the auxiliary drive. This configuration is particularly cost-effective and compactly constructed. As the adjusting drive is formed by the auxiliary drive, one drive can be saved.

In a preferred implementation, in the event of an adjusting movement of the machining device, a compensating movement of the workpiece or the machining device is generated by means of the main drive in order to re-establish the relative position of the machining device and the workpiece before the corresponding adjusting movement. If different relative positions of the machining device and the workpiece were to exist before and after the adjusting movements of the machining device, this would generally need to be taken into consideration in controlling the movement for the subsequent machining of the workpiece. However, if the relative position is maintained or if the relative position is re-established, the movement sequences are clearer and their control is substantially simplified overall.

In the interests of high machining speeds, in some implementations a relative movement between the machining device and the workpiece is provided for machining the workpiece and can be generated by superimposing a main movement of the workpiece and/or the machining device and an auxiliary movement of the machining device starting from a set initial position. If, for example, the machining device is moved along a movement axis (e.g. x axis or y axis) by means of the auxiliary drive, and the workpiece is simultaneously displaced along the same movement axis but in the opposite direction by means of the main drive, the two differently generated movement components are combined to produce an overall movement. Consequently, the individual accelerations of the main drive on the one hand and the auxiliary drive on the other hand are also combined to produce an overall acceleration. The high overall acceleration achieved allows the workpiece to be machined with high machining speeds, in some cases along small radii of curvature.

In some implementations, the movement components for the main movement and the auxiliary movement are apportioned in such a way that a path-following error of the machining device moved with a main movement and/or of the workpiece moved with a main movement is compensated for by means of the auxiliary movement of the machining device. For example, a heavy workpiece can be moved along a rough path of movement by means of the main drive when the workpiece is machined along a contour with small radii of curvature in order to protect the drive, while the substantially lighter machining device precisely follows the contour with auxiliary movements.

In some implementations, the adjustment region of the machining device is substantially larger at least in one direction than the maximum expected path-following error of the machining device moved with a main movement and/or of the workpiece moved with a main movement. The adjustment region may correspond, for example, to eight times the path-following error to be expected. As a result for initial positions of the machining device within a relatively large part of the adjustment region, the path-following error to be expected can be compensated for by means of an auxiliary movement in any direction. Consequently, the main movement and the auxiliary movement can be superimposed, with protection of the drive, in the case of initial positions which are very different, i.e. spaced far apart. Accordingly, the adaptability to different machining tasks is particularly marked.

In some cases, an initial position of the machining device within the adjustment region is associated with a defined auxiliary-movement region, within which the machining device is movable as necessary with an auxiliary movement starting from the set initial position, in order to achieve high processing reliability. As the machining device, starting from a set initial position, only executes auxiliary movements within a defined auxiliary-movement region, only within this limited region is it necessary to prevent the machining device from colliding with other functional units.

In some implementations, different positions of the machining device in relation to a further functional unit of the machine are associated with different initial positions of the machining device. Therefore, on the one hand the machining device can be positioned into different initial positions which are each advantageous for different machining tasks. On the other hand, the initial position of the machining device takes account of other functional units. For example, by selecting an appropriate initial position, the distance between a workpiece holder, provided as a further functional unit, and the machining device in the initial position can be defined so that regions of the metal sheet in the immediate vicinity of the workpiece holder can be machined (minimization of dead regions).

In some embodiments, the machining device is in the form of a cutting beam, e.g., a laser-cutting beam.

A workpiece holder, e.g., a clamping claw, can be provided as a further functional unit. In this case, an appropriate initial position of the machining device can—as already explained hereinabove—enable dead regions to be reduced.

A cutting die can also be provided as a further functional unit, the cutting die having a die opening into which the cutting beam extends during machining of the workpiece. This allows both the preset initial positions and the mutual positions of the machining device and the cutting die to be varied. This allows particularly small sheet-metal blanks to be cut out without them falling into the opening in the cutting die after having been cut out. For this purpose, the machining device can adopt an initial position in an edge region of the cutting die.

In some implementations, the size of the adjustment region of the machining device is adapted e.g. to the size of a cutting die, so that the cutting beam is arranged within the opening of the cutting die in any initial position. This can allow effective removal of resulting emissions through the opening in the cutting die in any initial position.

A workpiece support can also be provided as a further functional unit. In this case, by changing the mutual positions of the machining device and the workpiece support, the portions of the workpiece which are supported by the workpiece support during machining of the workpiece can be varied.

In some implementations, for movement of the machining device, a machining head, on which the machining device is arranged, is movable by means of the auxiliary drive and/or by means of the adjusting drive along a guide provided on the machine.

Some implementations are distinguished by particularly short processing times. For example, an initial position of the machining device for cutting out a workpiece blank to be produced can be defined so that the workpiece blank adopts a particular position within the machine after having been cut out. It can then advantageously be discharged from this position without additional repositioning.

In the interests of automatic co-ordination of the different movement components, a numerical machine control system can be provided for controlling the main, the auxiliary and the adjusting drive.

In some cases, one of the initial positions of the machining device is defined as a standard initial position. This can be advantageous from the point of view of control engineering. Owing to the definition of a standard initial position, an initial position only has to be separately preset when the machining device is to be positioned into an initial position deviating from the standard initial position.

The machining device may, in some cases, be positioned into one of the initial positions so as to be adapted to a subsequent step which follows machining of the workpiece, for example discharge of a workpiece blank.

From the point of view of control engineering, simple relationships are produced when a relative movement of the machining device and the workpiece is generated exclusively by means of a main movement of the workpiece for the purpose of machining the workpiece, which takes place after positioning of the machining device into an initial position. A simply controllable workpiece machining process results when the machining device, irrespective of the preset initial position, can only execute auxiliary movements within the adjustment region. When auxiliary movements are limited to the adjustment region, in the case of a set initial position at the edge of the adjustment region substantially only auxiliary movements directed away from the edge of the adjustment region can take place. Directional limitation of the auxiliary movement would generally only be achievable with great control-engineering expenditure. This expenditure is not incurred if the relative movement is generated exclusively by means of a main movement, i.e. without an auxiliary movement.

The details of one or more embodiments of the invention are set forth in the accompanying drawings and the description below. Other features and advantages of the invention will be apparent from the description and drawings, and from the claims.

DETAILED DESCRIPTION

Figure 1:
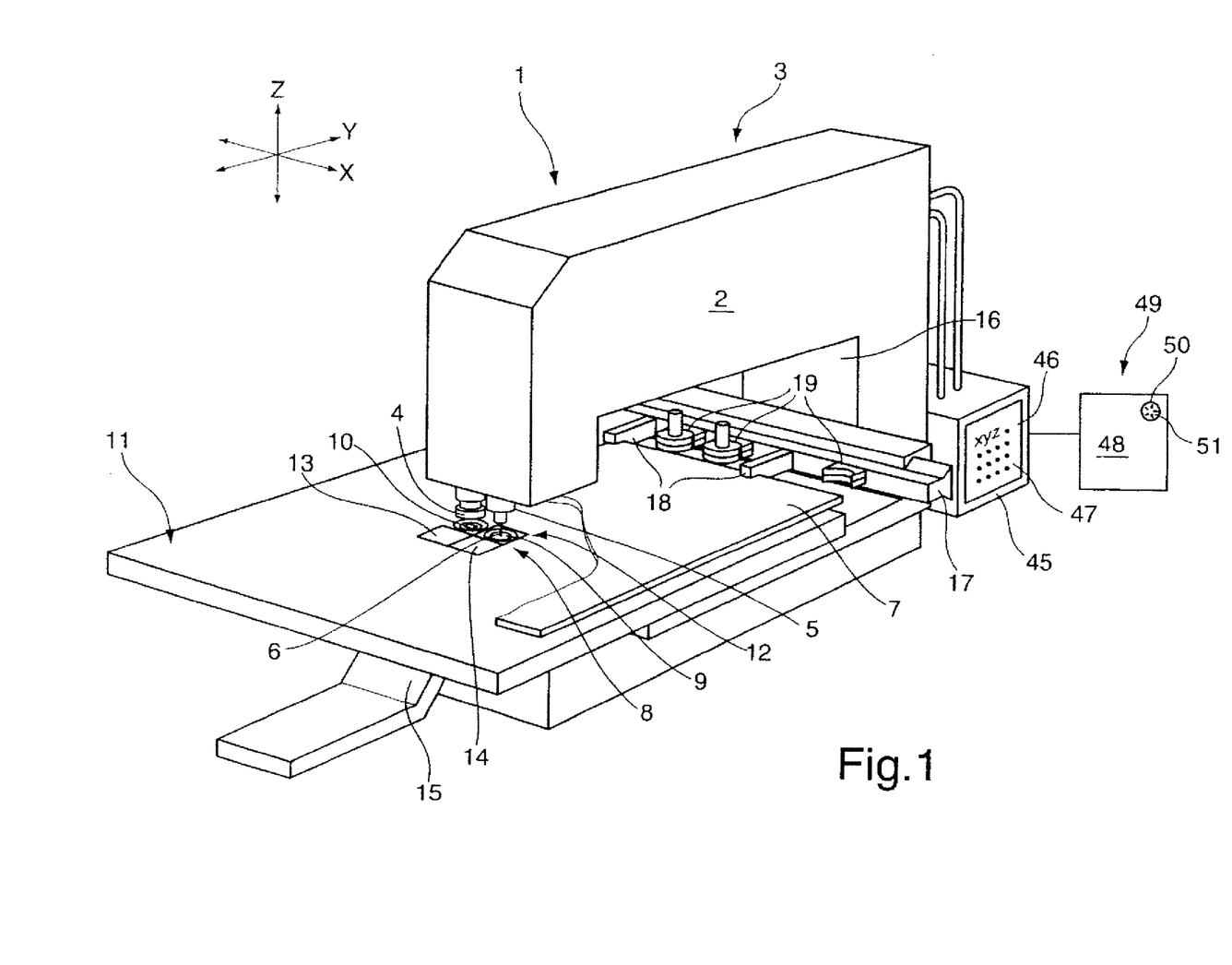
FIG. 1 shows a combined punching/laser-cutting machine with a punching head and a laser-cutting head.

FIG. 1 shows a machine 1 in the form of a combined punching/laser-cutting machine. Two machining heads—a punching head 4 and a laser-cutting head 5—are provided on an upper frame leg 2 of a C-shaped machine frame 3 of the machine 1. The laser-cutting head 5 is a source of a thermal cutting beam in the form of a laser-cutting beam 6, which serves as a machining device of the machine 1. On a side, remote from the laser-cutting head 5, of a metal sheet 7 to be machined, i.e. underneath the laser-cutting head 5, is arranged a cutting die in the form of a laser-cutting die 8. This has a die opening 9, into which the laser-cutting beam 6 extends during machining of the workpiece. Emissions produced during laser machining are removed via the die opening 9 by means of a suction arrangement (not shown). A lower punching tool 10 is provided underneath the punching head 4.

Sheet-metal blanks are obtained from the metal sheet 7 by means of the machine 1. The sheet-metal blanks cut out of the metal sheet 7 can be discharged from the machine 1 in various ways.

Either an operator removes them by hand or they are conveyed out of the machine 1 by means of handling devices (not shown), for example by means of a suction frame. For the removal of sufficiently small sheet-metal blanks, a workpiece support 11 which supports the metal sheet 7 has a plurality of flaps 12, 13, 14. Openings in the workpiece support 11 can be opened and closed by means of the flaps 12, 13, 14. The flap 12 is arranged underneath the laser-cutting head 5. The flap 12 simultaneously serves as a support for the laser-cutting die 8 so that, during an opening or closing movement of the flap 12, the laser-cutting die 8 moves with it. The flaps 13, 14 are provided in front of the lower punching tool 10 and the laser-cutting die 8. When the flaps 12, 13, 14 are opened, the sheet-metal blanks can fall through the openings, which are closable by means of the flaps 12, 13, 14, onto a slide 15 arranged underneath the workpiece support 11.

In addition, relatively small sheet-metal blanks which are not intended for further use, i.e. relatively small waste components, can be removed from the machine 1 through the die opening 9.

The relative movement, necessary for machining a workpiece, between the metal sheet 7 and the machining devices, in particular the laser-cutting beam 6, is generated in part by means of a conventional co-ordinate guide 17 arranged in a jaw 16 of the machine frame 3. The metal sheet 7 is fastened to the co-ordinate guide 17 by workpiece holders formed as clamping claws 18. In addition, the co-ordinate guide 17 has workpiece holders 19 of a tool magazine.

The metal sheet 7 can be freely moved within an x/y plane (co-ordinate axes x, y in FIG. 1). The co-ordinate guide 17 forms the main drive for the relative movement of the laser-cutting beam 6 on the one hand and the metal sheet 7 on the other hand. Accordingly, the metal sheet 7 is movable with a main movement by means of the co-ordinate guide 17.

In addition to the main movement of the metal sheet 7, generated by the co-ordinate guide 17, a relative movement between the metal sheet 7 and the laser-cutting beam 6 can be generated by movement of the laser-cutting beam 6. For this purpose, the laser-cutting head 5 is movably guided on the frame leg 2 of the machine 1. The possible movements of the laser-cutting head 5 in relation to the metal sheet 7 are illustrated in FIG. 1 by co-ordinate axes x, y, z.

Figure 2:
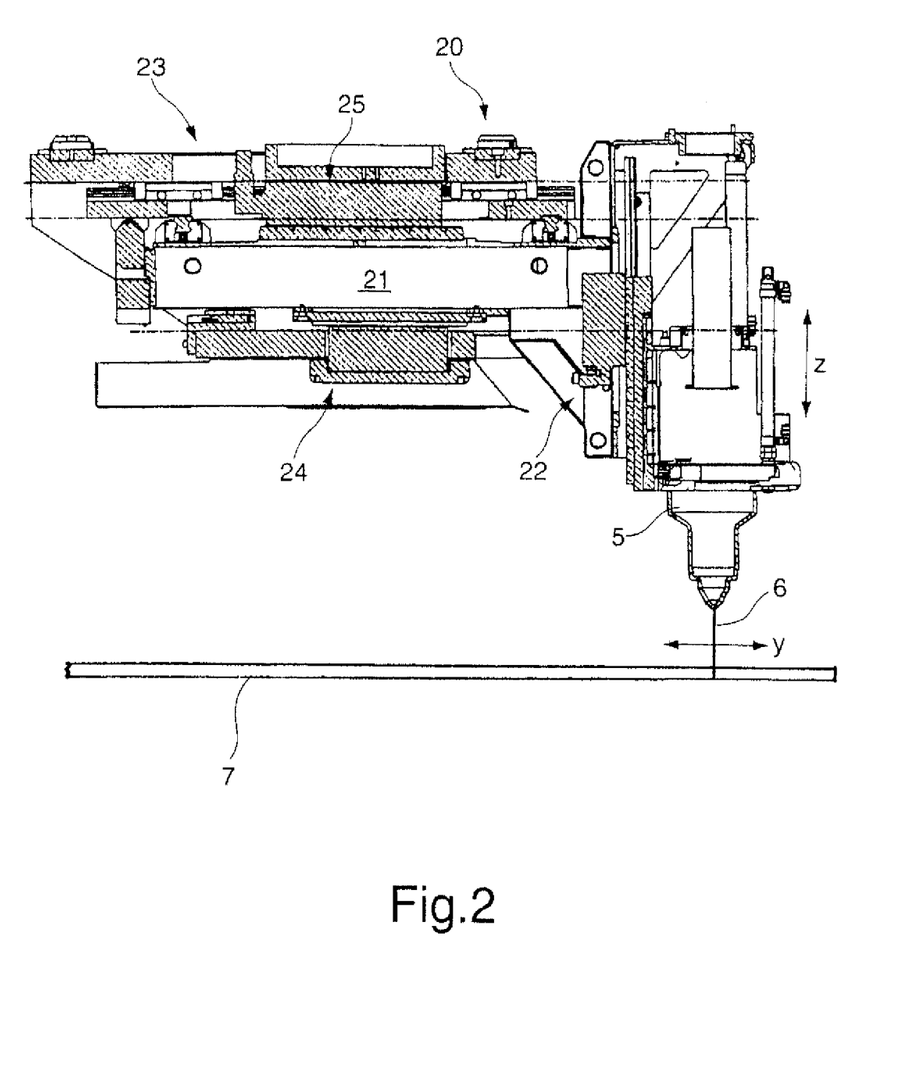
FIG. 2 shows the laser-cutting head of the combined punching/laser-cutting machine according to FIG. 1, with a motion unit of the laser-cutting head.

The movement of the laser-cutting head 5 is generated by means of a linear drive 20 (FIG. 2). The laser-cutting head 5 is movable along the z axis in relation to a carriage 21 by means of a z-drive unit 22. Owing to the possibility of moving the laser-cutting head 5 in the z direction, the distance between the laser-cutting head 5 and the metal sheet 7 can be changed in order to adjust the focal position of the laser-cutting beam 6, emerging from the laser-cutting head 5, in relation to the metal sheet 7 to be machined.

The carriage 21 provided with the laser-cutting head 5 is supported on the upper frame leg 2 of the machine frame 3 so as to be movable both in the x direction and in the y direction. The x direction extends perpendicularly to the drawing plane in FIG. 2. To guide the carriage 21 and the laser-cutting head 5 mounted thereon for movement in the x and the y directions, a guide 23 formed in the manner of a cross slide is provided on the machine. An x-drive unit 24 and a y-drive unit 25, which are constructed as high-dynamic linear drives, serve to drive the carriage 21 in the x/y plane. Such an arrangement is disclosed in co-pending application U.S. Ser. No. 12/145,968, filed on Jun. 25, 2008 and issued as U.S. Pat. No. 8,248,004, the complete disclosure of which is incorporated herein by reference.

The maximum acceleration of the laser-cutting head 5 in the x/y plane achievable by means of the x-drive unit 24 and the y-drive unit 25 is substantially greater than the maximum acceleration of the metal sheet 7 achievable by means of the co-ordinate guide 17. However, the metal sheet 7 can be moved by means of the co-ordinate guide 17 over a substantially larger movement area than the laser-cutting head 5 by means of the x-drive unit 24 and the y-drive unit 25.

Within an adjustment region 26, the laser-cutting beam 6 can be positioned by means of the x-drive unit 24 and the y-drive unit 25 into different initial positions for machining the workpiece. Accordingly, the x-drive unit 24 and the y-drive unit 25 serve as adjusting drives.

Figure 3:
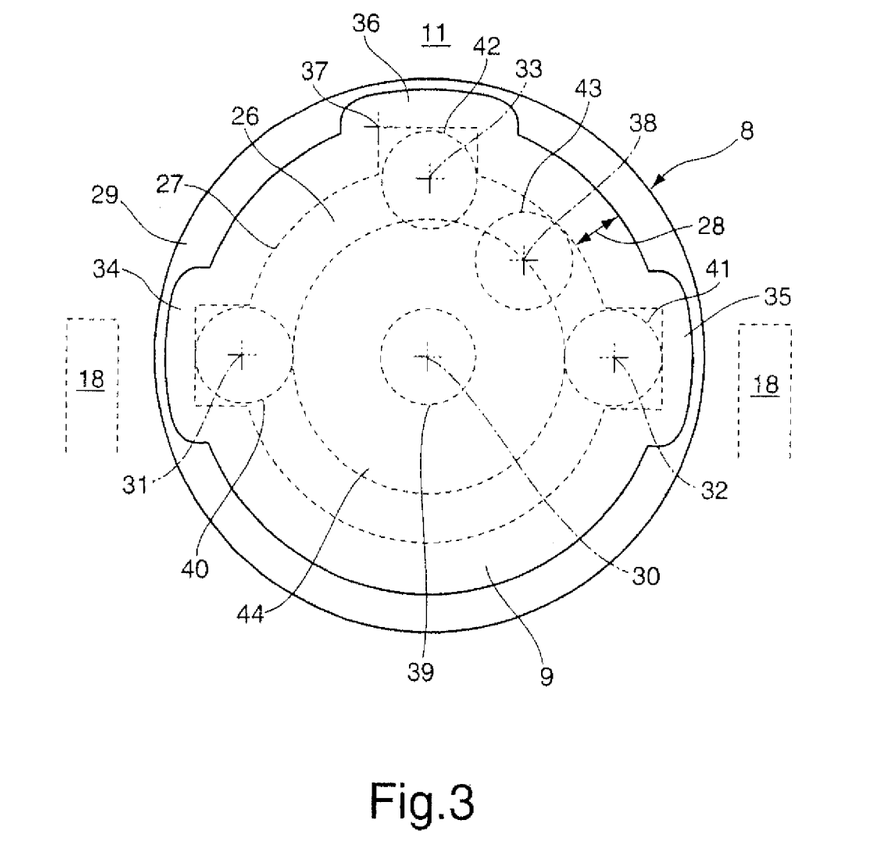
FIG. 3 shows a plan view of a laser-cutting die of the combined punching/laser-cutting machine according to FIG. 1.

The adjustment region 26 corresponds to the region bounded in FIG. 3 by an edge 27, which is indicated by a broken line. The adjustment region 26 lies completely within the die opening 9 and is adapted to its shape and size. The edge 27 of the adjustment region 26 is spaced apart from a die edge 29, which surrounds the die opening 9 and is inclined in relation to the horizontal, by a safety distance 28. The workpiece support 11 is adjacent to the die edge 29.

In a standard initial position 30, the laser-cutting beam 6 is centrally arranged in the die opening 9. The positions 31, 32 and 33 in FIG. 3 are shown as further initial positions of the laser-cutting beam 6. In the initial positions 31, 32, 33, the laser-cutting beam 6 is in each case arranged within a recess 34, 35 or 36 of the die opening 9. In a further initial position 37, the laser-cutting beam 6 adopts a position at the edge 27 of its adjustment region 26. An initial position 38 arranged radially between the standard initial position 30 and the initial position 37 is additionally shown in FIG. 3.

The relative movement, provided for machining the workpiece, between the laser-cutting beam 6 and the metal sheet 7 can be generated along one and the same plane, namely the x/y plane, both by means of the co-ordinate guide 17 and by means of the x-drive unit 24 and/or the y-drive unit 25. By means of the x-drive unit 24 and the y-drive unit 25, the laser-cutting beam 6 can be moved, as necessary, with an auxiliary movement starting from the respective initial position set. Accordingly, the x-drive unit 24 and the y-drive unit 25 serve not only as adjusting drives, but also as auxiliary drives.

Fundamentally, it can be advantageous to form the machining device so that it is positionable into different initial positions by a main movement and an auxiliary movement that are generated along only one common movement axis. Such an arrangement is disclosed in co-pending application U.S. Ser. No. 12/145,717, filed on Jun. 25, 2008 and issued as U.S. Pat. No. 7,899,575, the complete disclosure of which is incorporated herein by reference.

In the example shown, the relative movement of the laser-cutting beam 6 and the metal sheet 7 is produced by superimposing the main movement of the metal sheet 7 (generated by means of the co-ordinate guide 17) and the auxiliary movement of the laser-cutting beam 6 (generated by means of the x-drive unit 24 and/or the y-drive unit 25), starting from a set initial position.

Starting from a set initial position, the laser-cutting beam 6 executes an auxiliary movement, the amount of which does not exceed the maximum occurring path-following error of the metal sheet 7. The development of the path-following error of the metal sheet 7 will be discussed in further detail hereinbelow.

An initial position of the laser-cutting beam 6 is associated with an auxiliary-movement region, within which the laser-cutting beam 6 is movable as necessary by means of the x-drive unit 24 and/or the y-drive unit 25 with an auxiliary movement starting from the set initial position.

Circular auxiliary-movement regions 39, 40, 41, 42, 43 associated with the initial positions 30, 31, 32, 33, 38 are shown in FIG. 3. The radii of the auxiliary-movement regions 39, 40, 41, 42, 43 correspond to the amount of the maximum expected path-following error of the metal sheet 7. The laser-cutting beam 6 can fundamentally only execute auxiliary movements within the adjustment region 26. Outside the adjustment region 26, the suction of the emissions produced during laser cutting would not be guaranteed and e.g. the die edge 29 would be damaged by the laser-cutting beam 6.

The diameter of the adjustment region 26 of the laser-cutting beam 6 corresponds approximately to eight times the maximum expected path-following error. This allows the initial position to be changed over a large area without restricting the auxiliary movements that need to be executed in order to compensate for a path-following error which has actually occurred.

In the standard initial position 30, the radial distance between the laser-cutting beam 6 and the die edge 29 is very great in all positions within the auxiliary-movement region 39. Consequently, damage to or soiling of the die edge 29 during laser machining starting from the standard initial position 30 is substantially avoided.

The auxiliary-movement region 43 for the initial position 38 is directly adjacent to the edge 27 of the adjustment region 26 so that the laser-cutting beam 6 can execute an auxiliary movement, with the amount of the maximum expected path-following error, within the x/y plane in any direction starting from the initial position 38. Only in the case of initial positions which lie within the circular region 44 indicated in FIG. 3 is it ensured that an auxiliary movement, with the amount of the maximum expected path-following error, is possible within the x/y plane in any direction starting from the set initial position. The initial positions 31, 32, 33 are an exception owing to the recesses 34, 35, 36.

If the laser-cutting beam 6 is positioned into the initial positions 31 or 32, it is possible to machine regions of the metal sheet 7 in the immediate vicinity of the clamping claws 18, which regions could not be machined if a laser-cutting beam 6 were arranged in the standard initial position 30. The clamping claws 18 cannot be moved further towards the laser-cutting die 8 than is shown in FIG. 3 without colliding with the die edge 29. Consequently, the initial positions 31 and 32 are distinguished by minimization of dead regions.

A further advantage of positioning the laser-cutting beam 6 into the initial positions 31, 32, like the advantage of the positioning of the laser-cutting beam 6 into the initial position 33, consists in that the distance of the laser-cutting beam 6 from the region of the workpiece support 11 adjacent to the laser-cutting die 8 is smaller compared with the corresponding distance when the laser-cutting beam 6 is positioned into the standard initial position 30. This is significant above all when discharging a sheet-metal blank which has been cut out by means of the laser-cutting beam 6.

If a sheet-metal blank is so small that it could fall through the die opening 9, but is not intended to be discharged via the die opening 9 like a waste component, it must be ensured that the centre of gravity of the surface of the sheet-metal blank is arranged above the workpiece support 11 and not above the die opening 9 when the sheet-metal blank is finally separated from the remainder of the metal sheet. However, this is only possible when the distance of the centre of gravity of the surface of the sheet-metal blank from the final connection to be cut through between the sheet-metal blank and the remainder of the sheet by means of the laser-cutting beam 6 is greater than the distance of the laser-cutting beam 6 from the workpiece support 11. Thus the smaller the distance of the laser-cutting beam 6 from the workpiece support 11, the smaller it is possible to cut out sheet-metal blanks without them falling into the die opening 9.

For example, all positions of the laser-cutting beam 6 within the auxiliary-movement region 42 are distinguished by their proximity to the workpiece support 11. Nevertheless, the distance between the laser-cutting beam 6 and the workpiece support 11 varies greatly according to which of the positions within the auxiliary-movement region 42 the laser-cutting beam 6 adopts as a result of an auxiliary movement during the laser-cutting process. Even when the laser-cutting beam 6, for the final separating cut, adopts that position within the auxiliary-movement region 42 which has the greatest distance from the workpiece support 11, it must be ensured that the centre of gravity of the surface of the respective sheet-metal blank is arranged above the workpiece support 11.

Sheet-metal blanks which, after the final cut, come to lie above the workpiece support 11 in front of the cutting die 8, i.e. in the direction of the flap 14 starting from the cutting die 8, can be conveyed out of the machine 1 by a reliable process by opening the flap 12 and, depending upon the size of the sheet-metal blank, by additionally opening the flap 14. For this reason, the initial position 33 is particularly advantageous when cutting out small parts which are to be discharged via the flaps 12, 14.

In the preset initial position 37, the distance between the laser-cutting beam 6 and the workpiece support 11 corresponds to the width of the die edge 29 including the safety distance 28 and is thereby minimal. Consequently, when the laser-cutting beam 6 is positioned into the initial position 37, the smallest sheet-metal blanks which are not intended to fall into the die opening 9 can be cut out. However, owing to the proximity to the die edge 29, this position of the laser-cutting beam 6 gives rise to the risk of the die edge 29 becoming worn and soiled.

Furthermore, in the initial position 37 of the laser-cutting beam 6 the maximum possible machining speed is relatively low.

For example, starting from the initial position 37, the laser-cutting beam 6 could only execute auxiliary movements which are directed away from the die edge 29. In order to avoid the control-engineering expenditure which would be associated with the production of such auxiliary movements with a directional restriction in the x/y plane, a method of operating the machine 1 is selectable in which the relative movement, to be executed for machining the workpiece, between the laser beam 6 and the metal sheet 7 is generated exclusively by means of the co-ordinate guide 17. A further advantage of this method of operation consists in that the very small distance of the laser-cutting beam 6 from the workpiece support 11 is maintained throughout the entire cutting process. However, the cutting speeds achievable solely by movement of the workpiece, in particular in the case of contours with small radii of curvature, are lower than in other initial positions, which permit other methods of operation described hereinbelow.

Apart from the aforementioned method of operation with a relative movement generated exclusively by means of the co-ordinate guide 17, the machine 1 can, if necessary, also be operated by a method in which the relative movement of the laser-cutting beam 6 and the metal sheet 7 is generated exclusively by means of the x-drive unit 24 and/or the y-drive unit 25.

If possible, however, the selected method of operating the machine 1 is that in which the relative movement, to be executed for the cutting process, between the laser-cutting beam 6 and the metal sheet 7 is produced by superimposing a main movement—generated by means of the co-ordinate guide 17—and an auxiliary movement generated by means of the x-drive unit 24 and/or the y-drive unit 25. In this method of operation, the sum of the maximum accelerations of the co-ordinate guide 17 and the x-drive unit 24 and/or the y-drive unit 25 produces the maximum overall acceleration of the laser-cutting beam 6 relative to the metal sheet 7. Owing to the higher overall acceleration, higher machining speeds or cutting speeds can be achieved than with the other two methods of operation.

In particular when the workpiece is machined along small radii of curvature, the metal sheet 7 is moved along a relatively rough path of movement by means of the co-ordinate guide 17. The reason for this is that the acceleration of the co-ordinate guide 17 is not sufficient to follow precisely a tightly curved machining contour at high speed. Instead, a path-following error of the metal sheet 7 occurs ("dragging error"). The higher the preset machining speed is and/or the lower the maximum acceleration of the co-ordinate guide 17 and the lower a preset amplification factor for controlling the movement of the co-ordinate guide 17 are, the greater the resulting path-following error is. The amplification factor determines the amount by which the control system tries to compensate for a deviation from a desired value, e.g. a desired speed value.

The high-dynamic auxiliary movements of the laser-cutting beam 6, which are superimposed on the movement of the metal sheet, make it possible to compensate for the respective resulting path-following error of the metal sheet 7.

Figure 4:
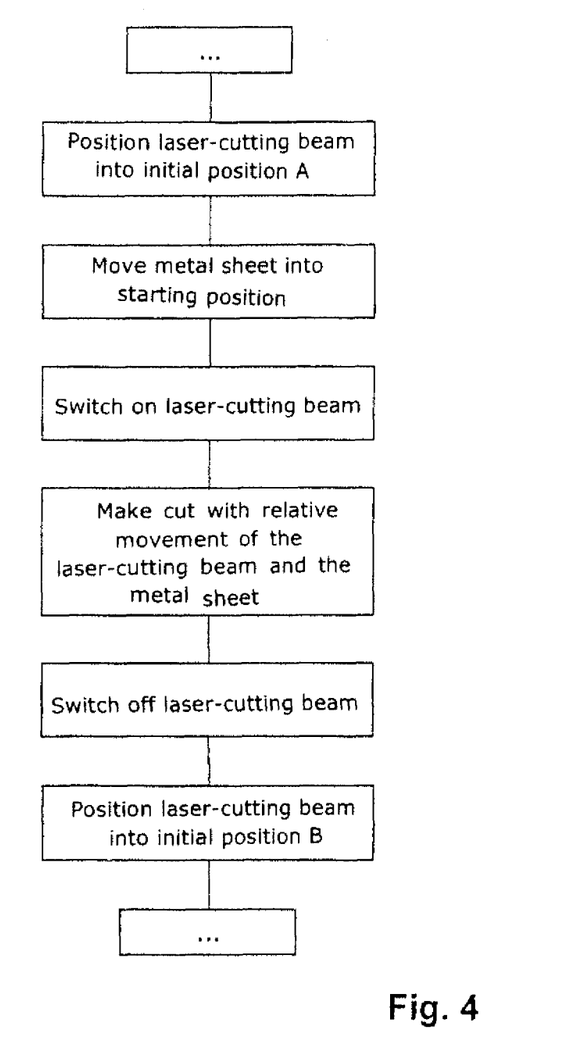
FIG. 4 shows individual steps of a process for machining a workpiece with a combined punching/laser-cutting machine according to FIG. 1.

Individual steps of a process for machining a workpiece by means of the machine 1 will be described hereinbelow with reference to FIG. 4.

If an initial position deviating from the standard initial position 30 is necessary for a machining process, for example owing to the intended discharge of a sheet-metal blank from the machine 1, the laser-cutting beam 6 is positioned by means of the x-drive unit 24 and/or the y-drive unit 25 into the respective initial position (initial position A according to FIG. 4) deviating from the standard initial position 30 within the adjustment region 26 by an adjusting movement.

Simultaneously with the adjusting movement of the laser-cutting beam 6, the metal sheet 7 is moved by means of the co-ordinate guide 17 by the same amount and in the same direction. The relative position of the laser-cutting beam 6 and the metal sheet 7 is thereby maintained, despite the adjustment of the laser-cutting beam 6 into a different initial position. In this way, the movement sequences of the machine 1 are more clearly and more easily programmable.

It can be advantageous to adapt the speed of the compensating movement of the metal sheet 7 to the speed of the adjusting movement of the laser-cutting beam 6 so that the relative position of the laser-cutting beam 6 and the metal sheet 7 remains unchanged during the entire adjusting movement of the laser-cutting beam 6. In this case, it is ensured, for example, that the laser-cutting head 5 does not collide with possible deformations of the metal sheet 7 during the adjusting movement.

After the initial position of the laser-cutting beam 6 has been set, the metal sheet 7 is moved by means of the co-ordinate guide 17 and the laser-cutting beam 6 is thus positioned in relation to the metal sheet 7 into a starting position from which a cut is to be made in the metal sheet 7.

After the laser-cutting beam 6 has been switched on, the metal sheet 7 is cut, with relative movement of the metal sheet 7 and the laser-cutting beam 6. This relative movement is generated by a main movement of the metal sheet 7, which is superimposed as necessary by an auxiliary movement of the laser-cutting beam 6. After the cut has been made, the laser-cutting beam 6 is switched off. The laser-cutting beam is then displaced into another initial position (initial position B according to FIG. 4) before further sequences of the above-described type take place.

During machining of the workpiece, the machine 1 is controlled by means of a numerical machine control system 45 (FIG. 1). A machining program 47 containing control commands 46 is run by the numerical machine control system 45. The machining program 47 comprises a plurality of control commands 46 for all processes implemented during the machining of the metal sheet 7. These include, for example, control commands 46 for switching the laser-cutting beam 6 on and off and for opening and closing the flaps 12, 13, 14.

In particular, control commands 46 produce the adjusting movements of the laser-cutting beam 6 into different initial positions. These control commands 46 induce the numerical machine control system 45 to generate adjusting signals for the x-drive unit 24 and/or the y-drive unit 25, by means of which the laser-cutting beam 6 is positioned into one of the different initial positions. In addition, the machine control system 45 generates adjusting signals for the co-ordinate guide 17 in order to effect the above-described compensating movement of the metal sheet 7 for re-establishing or maintaining a relative position of the laser-cutting beam 6 and the metal sheet 7. For example, an individual control command "Move Head (X1, Y1)" is provided which effects movement of the laser-cutting beam 6 by means of the x-drive unit 24 and/or the y-drive unit 25 into an initial position with the co-ordinates X1 and Y1 within the adjustment region 26. At the same time, the compensating movement of the metal sheet 7 is also effected on the basis of the control command "Move Head (X1, Y1)".

Furthermore, control commands 46 are provided for changing between the different methods of operating the machine 1. Solely on the basis of an individual control command, e.g. "Master Mode", all subsequent changes to the relative position of the laser-cutting beam 6 and the metal sheet 7 are implemented exclusively by means of the co-ordinate guide 17, i.e. by means of main movements of the metal sheet 7. An individual control command, e.g. "Master/Slave Mode", is likewise used to change over to the method of operation with superimposed main and auxiliary movements. The method of operation in which the relative movement of the laser-cutting beam 6 and the metal sheet 7 is generated exclusively by means of the x-drive unit 24 and/or the y-drive unit 25 can for example be implemented by an individual control command "Slave Mode".

The machining program 47 is written by means of a computer-aided programming system 48. The programming system 48 is formed as a computer program product 50 which has different software modules and is operated on the numerical machine control system 45 or on a separate data processing system 49. The computer program product contains appropriately adapted coding means 51. For example, the coding means 51 are formed by instructions which are to be processed by means of a processor of the data processing system 49.

Figure 5:
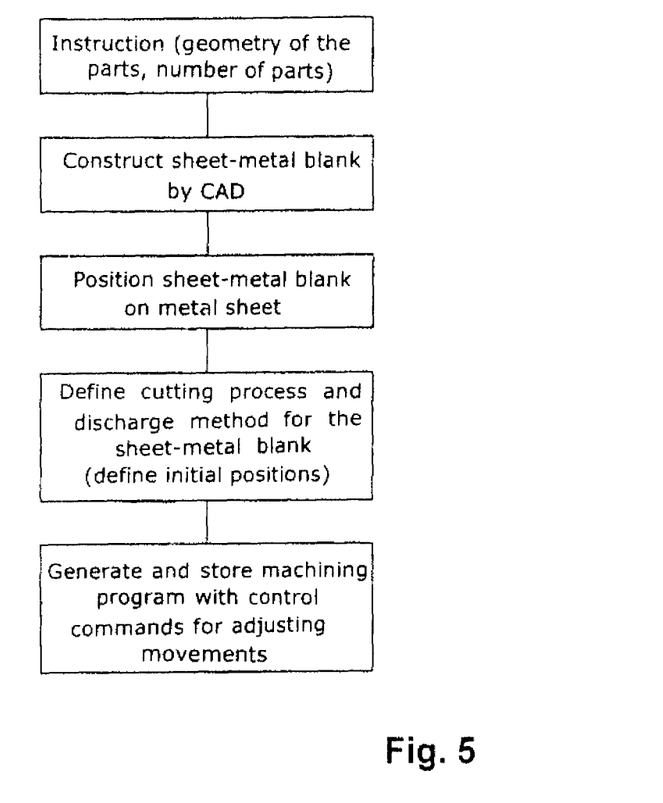
FIG. 5 shows a sequence for writing a machining program for a combined punching/laser-cutting machine according to FIG. 1.
Figure 6:
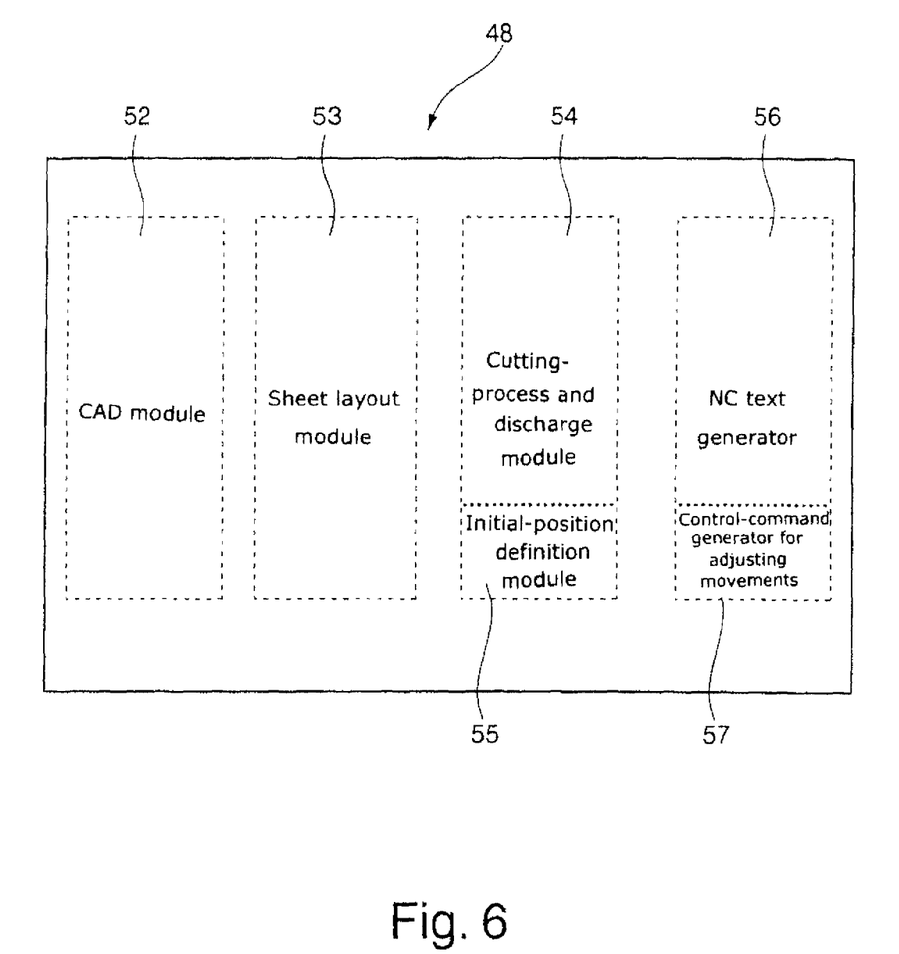
FIG. 6 shows the architecture of a programming system for writing a machining program for a combined punching/laser-cutting machine according to FIG. 1.

FIG. 5 illustrates individual steps of a process for writing a machining program 47. The architecture of the programming system 48 used for writing the machining program 47 is shown in FIG. 6.

Triggered by a machining instruction, the sheet-metal blanks to be produced are constructed with the desired geometry of the parts by means of a CAD module 52. Alternatively, CAD data from another CAD program can also be read in.

By means of a sheet layout module 53 of the programming system 48, a sheet-metal blank or its CAD model is positioned on the metal sheet 7 or its CAD model.

Next, the cutting process and with it, for example, the temporal sequence of the cuts to be made or the method of operation (e.g. main movement exclusively) when the cuts are made is determined. In addition, it is determined how the sheet-metal blank or a resulting waste component is to be discharged. If a plurality of discharge possibilities are available for a sheet-metal blank or for a waste component, the user of the programming system 48 has to choose between the possibilities. Overall, the cutting process and the discharge method are defined substantially automatically by means of a cutting-process and discharge module 54 of the programming system 48.

To define the different initial positions of the laser-cutting beam 6, the cutting-process and discharge module 54 has an initial-position definition module 55. On the basis of predetermined criteria, the initial-position definition module 55 establishes whether an initial position of the laser-cutting beam 6 deviating from the standard initial position 30 is necessary or advantageous for a particular cutting process and, if applicable, defines the initial position to be set.

In order to simplify the calculation algorithms for establishing the initial positions, only some of the theoretically possible initial positions within the adjustment region 26 are checked by the initial-position definition module 55. These are substantially the initial positions 30, 31, 32, 33, 37, 38 shown in FIG. 3. However, the selection of initial positions to be checked can be changed by the user.

An initial position deviating from the standard initial position 30 can be necessary when, for example, cuts are to be made in the metal sheet 7 in the vicinity of a clamping claw 18. It is first checked by means of the initial-position definition module 55 whether or not the region of the metal sheet to be machined can be moved with the aid of the co-ordinate guide 17 into the auxiliary-movement region 39 of the laser-cutting beam 6 in the standard initial position 30 without the clamping claw 18 colliding with the laser-cutting die 8. In particular, in order to ensure uninterrupted machining of the workpiece in the case of superimposition of a main movement and an auxiliary movement executed to compensate for the path-following error of the main movement, it is checked whether or not every point of the respective region of the metal sheet to be machined can be moved into any position within the auxiliary-movement region 39 by means of the co-ordinate guide 17 without any collisions. If this is not the case, the initial-position definition module 55 defines the initial position 31 or the initial position 32 as the initial position for this cutting process, depending upon which side of the laser-cutting die 8 the clamping claw 18 at risk of collision is arranged.

An initial position deviating from the standard initial position 30 is frequently defined by the initial-position definition module 55 in order to ensure a particular method of discharging the sheet-metal blank or a waste component. As criteria for defining the initial positions, the initial-position definition module 55 principally takes account of the envelope circle and the position of the centre of gravity of the surface of the sheet-metal blank or the waste component. The envelope circle determines whether or not the sheet-metal blank or the waste component can fall through the die opening 9. If the envelope circle of a sheet-metal blank would allow the sheet-metal blank to fall through the die opening 9, an initial position is selected in which it is ensured that the centre of gravity of the surface of the sheet-metal blank is arranged above the workpiece support 11 when the sheet-metal blank has been completely cut out.

If a plurality of sheet-metal blanks, in particular a plurality of different sheet-metal blanks, are to be obtained by machining a metal sheet 7, all the sheet-metal blanks can first be positioned on the metal sheet 7 by means of the sheet layout module 53 and then the cutting process and the discharge method can be determined jointly for all the sheet-metal blanks.

On the basis of the assessments made during the positioning of the sheet-metal blanks and during the definition of the cutting process and the discharge method, the control commands 46 are generated and stored in the necessary sequence by means of an NC text generator 56. A control-command generator 57 of the NC text generator 56 serves to generate the control commands 46 for the adjusting movements into different initial positions.

The finished machining program 47 can be transmitted to the machine 1 and be run on the machine control system 45 for producing the sheet-metal blanks A number of embodiments of the invention have been described. Nevertheless, it will be understood that various modifications may be made without departing from the spirit and scope of the invention. Accordingly, other embodiments are within the scope of the following claims.

What is claimed is:

1. A computer-readable medium having encoded thereon software for operating a control unit of a machine tool, the machine tool comprising a main drive, an auxiliary drive, and an adjusting drive, the software comprising:

first instructions for causing the main drive to move a machining device relative to a workpiece and/or moving the workpiece relative to the machining device, with a main movement, second instructions for causing the auxiliary drive to move the machining device relative to the workpiece with an auxiliary movement, and third instructions for causing the adjusting device to position the machining device within an adjustment region, into different initial positions, starting from which the machining device is moved as necessary with the auxiliary movement.

2. The computer-readable medium of claim 1 wherein the instructions are configured to be run on a numerical machine control system.

3. The computer-readable medium of claim 1 further comprising instructions causing the main drive to move the workpiece and/or the machining device, if the adjusting drive generates an adjusting movement of the machining device into one of the initial positions within its adjustment region, so that a relative position in which the machining device and the workpiece were arranged before the adjusting movement is re-established.

4. The computer-readable medium of claim 1, further comprising instructions causing a main movement of the workpiece and/or the machining device and an auxiliary movement of the machining device to be superimposed on one another, starting from a set initial position.

5. The computer-readable medium of claim 1 further comprising instructions for compensating for a path-following error of the machining device by moving the machining device with an auxiliary movement.

\* \* \* \* \*